(12) United States Patent  (10) Patent No.: US 7,542,034 B2
Spooner et al.  (45) Date of Patent: Jun. 2, 2009

(54) SYSTEM AND METHOD FOR PROCESSING VIDEO IMAGES

(75) Inventors: David A. Spooner, Calgary (CA); Todd Simpson, Calgary (CA)

(73) Assignee: Conversion Works, Inc., Calgary (CA)

( * ) Notice: Subject to any disclaimer, the term of this patent is extended or adjusted under 35 U.S.C. 154(b) by 858 days.

(21) Appl. No.: 10/946,955

(22) Filed: Sep. 22, 2004

(65) Prior Publication Data

US 2006/0061583 A1 Mar. 23, 2006

(51) Int. Cl.
G06T 15/00 (2006.01)
(52) U.S. Cl. ........................ 345/419; 382/154
(58) Field of Classification Search ............... None
See application file for complete search history.

(56) References Cited

U.S. PATENT DOCUMENTS

| | | | |
|---|---|---|---|
| 4,689,616 A * | 8/1987 | Goude et al. | 345/640 |
| 4,925,294 A | 5/1990 | Geshwind et al. | |
| 6,151,404 A * | 11/2000 | Pieper | 382/128 |
| 6,434,278 B1 * | 8/2002 | Hashimoto | 382/285 |
| 6,466,205 B2 * | 10/2002 | Simpson et al. | 345/419 |
| 6,477,267 B1 | 11/2002 | Richards | |

FOREIGN PATENT DOCUMENTS

EP 1 141 893 4/2005

OTHER PUBLICATIONS

Wurmlin S. et al., "3D Video Fragments: Dynamic point samples for Real-Time Free-Viewpoint Video", Computers and Graphics Elsevier UK, vol. 28 No. 1 Feb. 2004, pp. 3-14.
Chun-Jen Tsai et al., "Model-Based Synthetic View Generation from a Monocular Video Sequence", Image Processing, 1997 Proceedings, IEEE, vol. 1 Oct. 26, 1997, pp. 444-447.
International Search Report and Written Opinion Issued for PCT/US2005/031664, dated Apr. 6, 2005.

* cited by examiner

*Primary Examiner*—Kee M Tung
*Assistant Examiner*—Jwalant Amin
(74) *Attorney, Agent, or Firm*—Fulbright & Jaworski L.L.P.

(57) ABSTRACT

Some representative embodiments are directed to creating a "virtual world" by processing a series of two dimensional images to generate a representation of the physical world depicted in the series of images. The virtual world representation includes models of objects that specify the locations of the objects within the virtual world, the geometries of the objects, the dimensions of the objects, the surface representation of the objects, and/or other relevant information. By developing the virtual world representation, a number of image processing effects may be applied such as generation of stereoscopic images, object insertion, object removal, object translation, and/or other object manipulation operations.

24 Claims, 4 Drawing Sheets

LEFT VIEW    RIGHT VIEW

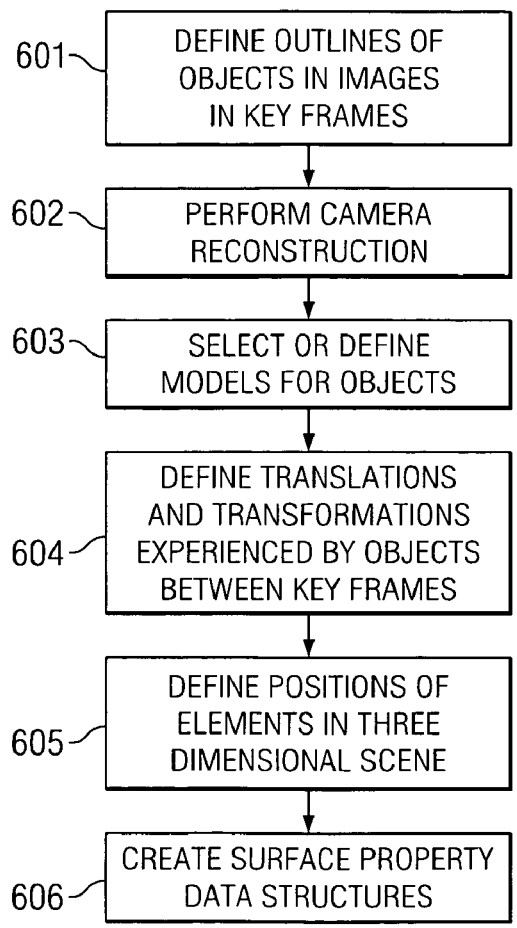
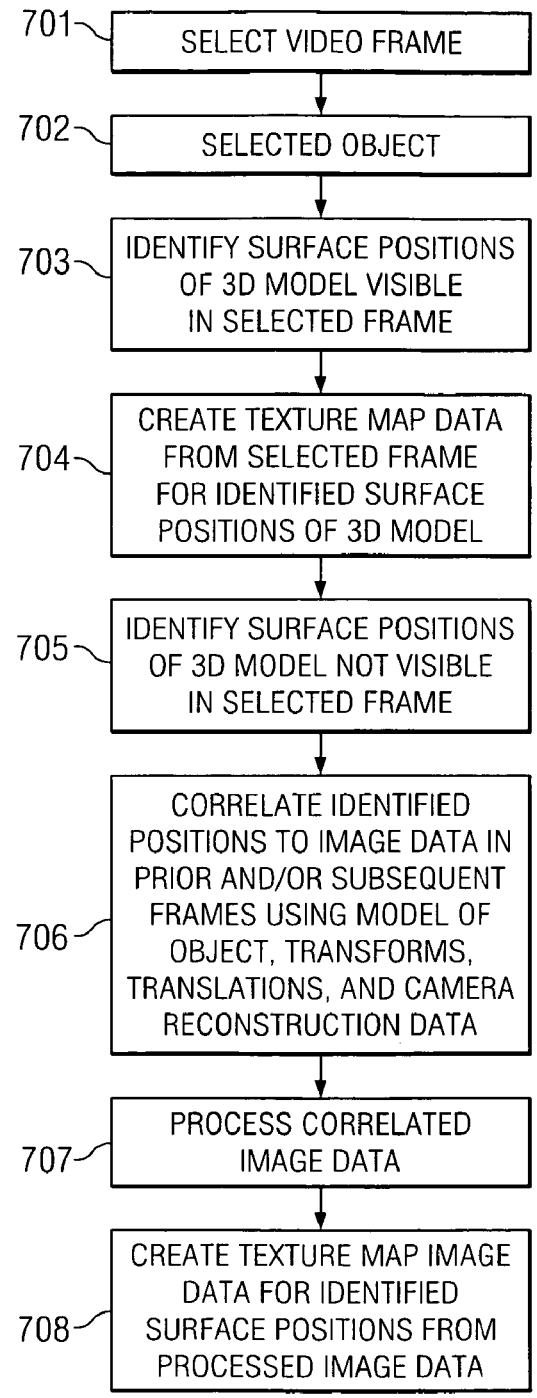

SYSTEM AND METHOD FOR PROCESSING VIDEO IMAGES

TECHNICAL FIELD

The present invention is generally directed to processing graphical images.

BACKGROUND

A number of technologies have been proposed and, in some cases, implemented to perform a conversion of one or several two dimensional images into one or several stereoscopic three dimensional images. The conversion of two dimensional images into three dimensional images involves creating a pair of stereoscopic images for each three dimensional frame. The stereoscopic images can then be presented to a viewer's left and right eyes using a suitable display device. The image information between respective stereoscopic images differ according to the calculated spatial relationships between the objects in the scene and the viewer of the scene. The difference in the image information enables the viewer to perceive the three dimensional effect.

An example of a conversion technology is described in U.S. Pat. No. 6,477,267 (the '267 patent). In the '267 patent, only selected objects within a given two dimensional image are processed to receive a three dimensional effect in a resulting three dimensional image. In the '267 patent, an object is initially selected for such processing by outlining the object. The selected object is assigned a "depth" value that is representative of the relative distance of the object from the viewer. A lateral displacement of the selected object is performed for each image of a stereoscopic pair of images that depends upon the assigned depth value. Essentially, a "cut-and-paste" operation occurs to create the three dimensional effect. The simple displacement of the object creates a gap or blank region in the object's background. The system disclosed in the '267 patent compensates for the gap by "stretching" the object's background to fill the blank region.

The '267 patent is associated with a number of limitations. Specifically, the stretching operations cause distortion of the object being stretched. The distortion needs to be minimized to reduce visual anomalies. The amount of stretching also corresponds to the disparity or parallax between an object and its background and is a function of their relative distances from the observer. Thus, the relative distances of interacting objects must be kept small.

Another example of a conversion technology is described in U.S. Pat. No. 6,466,205 (the '205 patent). In the '205 patent, a sequence of video frames is processed to select objects and to create "cells" or "mattes" of selected objects that substantially only include information pertaining to their respective objects. A partial occlusion of a selected object by another object in a given frame is addressed by temporally searching through the sequence of video frames to identify other frames in which the same portion of the first object is not occluded. Accordingly, a cell may be created for the full object even though the full object does not appear in any single frame. The advantage of such processing is that gaps or blank regions do not appear when objects are displaced in order to provide a three dimensional effect. Specifically, a portion of the background or other object that would be blank may be filled with graphical information obtained from other frames in the temporal sequence. Accordingly, the rendering of the three dimensional images may occur in an advantageous manner.

SUMMARY

Some representative embodiments are directed to creating a "virtual world" by processing a series of two dimensional images to generate a representation of the physical world depicted in the series of images. The virtual world representation includes models of objects that specify the locations of the objects within the virtual world, the geometries of the objects, the dimensions of the objects, the surface representation of the objects, and/or other relevant information. By developing the virtual world representation, a number of image processing effects may be applied.

In one embodiment, stereoscopic images may be created. To create a pair of stereoscopic images, two separate views of the virtual world are rendered that correspond to the left and right eyes of the viewer using two different camera positions. Rendering stereoscopic images in this manner produces three dimensional effects of greater perceived quality than possible using known conversion techniques. Specifically, the use of a three dimensional geometry to perform surface reconstruction enables a more accurate representation of objects than possible when two dimensional correlation is employed.

In one embodiment, the algorithm analysis and manual input are applied to a series of two dimensional images using an editing application. A graphical user interface of the editing application enables an "editor" to control the operations of the image processing algorithms and camera reconstruction algorithms to begin the creation of the object models. Concurrently with the application of the algorithms, the editor may supply the user input to refine the object models via the graphical user interface. By coordinating manual and autonomous image operations, a two dimensional sequence may be converted into the virtual world representation in an efficient manner. Accordingly, further image processing such as two to three dimension conversation may occur in a more efficient and more accurate manner than possible using known processing techniques.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 6 depicts a set of interrelated processes for developing a model of a three dimensional scene from a video sequence according to one representative embodiment.

FIG. 7 depicts a flowchart for generating texture data according to one representative embodiment.

DETAILED DESCRIPTION OF THE INVENTION

Figure 1:
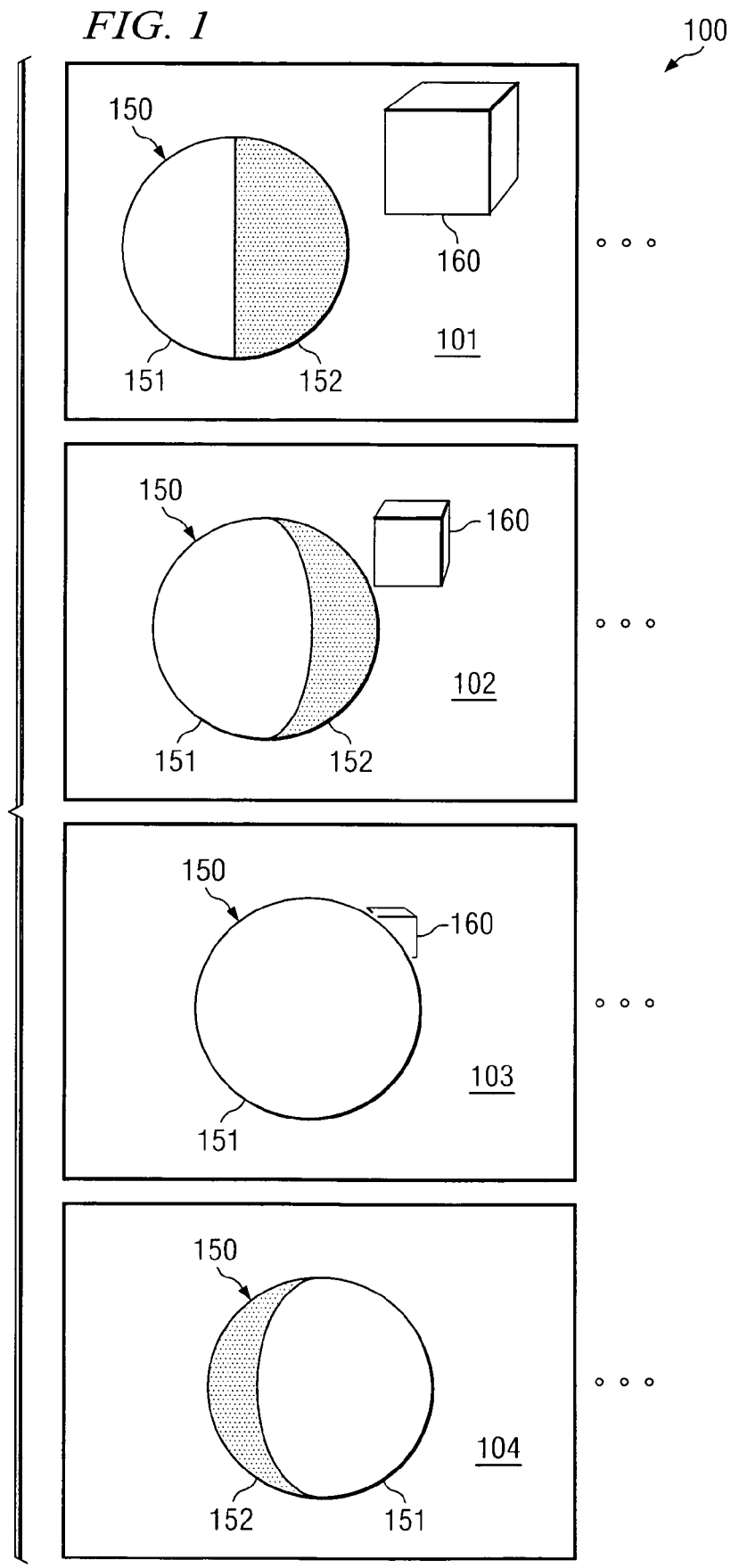
FIG. 1 depicts key frames of a video sequence.

Referring now to the drawings, FIG. 1 depicts sequence 100 of video images that may be processed according to some representative embodiments. Sequence 100 of video images includes key frames 101-104. Multiple other frames may exist between these key frames.

As shown in FIG. 1, sphere 150 possesses multiple tones and/or chromatic content. One half of sphere 150 is rendered using first tone 151 and the other half of sphere 150 is rendered using second tone 152. Sphere 150 undergoes rotational transforms through video sequence 100. Accordingly, in key frame 102, a greater amount of tone 151 is seen relative to key frame 101. In key frame 103, sufficient rotation has occurred to cause only tone 151 of sphere 150 to be visible. In key frame 104, tone 152 becomes visible again on the opposite side of sphere 150 as compared to the position of tone 152 in key frame 101.

Box 160 is subjected to scaling transformations in video sequence 100. Specifically, box 160 becomes smaller throughout video sequence 100. Moreover, box 160 is translated during video sequence 100. Eventually, the motion of box 160 causes box 160 to be occluded by sphere 150. In key frame 104, box 160 is no longer visible.

According to known image processing techniques, the generation of stereoscopic images for key frame 103 would occur by segmenting or matting sphere 150 from key frame 103. The segmented or matted image data for sphere 150 would consist of a single tone (i.e., tone 151). The segmented or matted image data may be displaced in the stereoscopic views. Additionally, image filling or object stretching may occur to address empty regions caused by the displacement. The limitations associated with some known image processing techniques are seen by the inability to accurately render the multi-tone surface characteristics of sphere 150. Specifically, because the generation of stereoscopic views according to known image processing techniques only uses the matted or segmented image data, known techniques would render sphere 150 as a single-tone object in both the right and left images of a stereoscopic pair of images. However, such rendering deviates from the views that would be actually produced in a three dimensional scene. In an actual three dimensional scene, the right view may cause a portion of tone 152 to be visible on the right side of sphere 150. Likewise, the left view may cause a portion of tone 152 to be visible on the left side of sphere 150.

Figure 2:
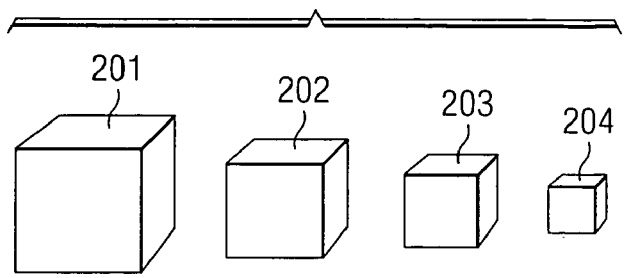
FIG. 2 depicts representations of an object from the video sequence shown in FIG. 1 generated according to one representative embodiment.

Representative embodiments enable a greater degree of accuracy to be achieved when rendering stereoscopic images by creating three dimensional models of objects within the images being processed. A single three dimensional model may be created for box 160. Additionally, the scaling transformations experienced by box 160 may be encoded with the model created for box 160. Representations 201-204 of box 160 as shown in FIG. 2 correspond to the key frames 101-104. Additionally, it is noted that box 160 is not explicitly present in key frame 104. However, because the scaling transformations and translations can be identified and encoded, representation 204 of box 160 may be created for key frame 104. The creation of a representation for an object that is not visible in a key frame may be useful to enable a number of effects. For example, an object removal operation may be selected to remove sphere 150 thereby causing box 160 to be visible in the resulting processed image(s).

In a similar manner, a three dimensional model may be selected or created for sphere 150. The rotational transform information associated with sphere 150 may be encoded in association with the three dimensional model.

Figure 3:
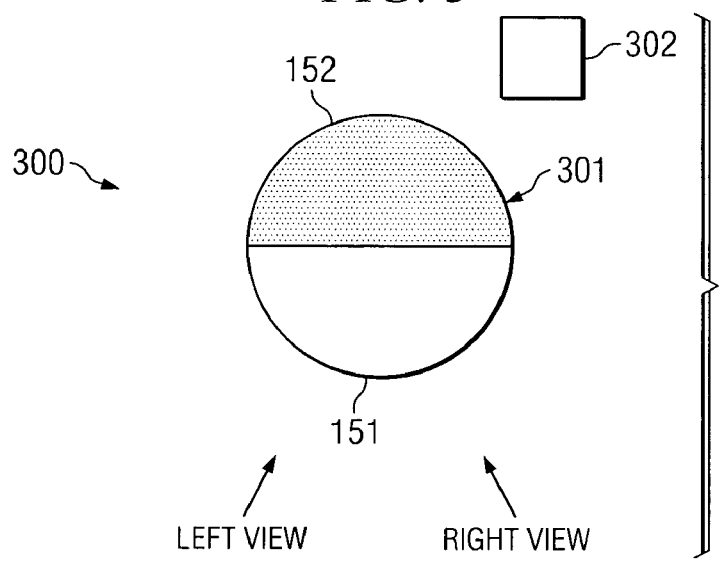
FIG. 3 depicts an "overhead" view of a three dimensional scene generated according to one representative embodiment.

Using the three dimensional models and camera reconstruction information, a three dimensional scene including the locations of the objects within the scene may be defined. FIG. 3 depicts an "overhead" view of scene 300 including three dimensional model 301 of sphere 150 and three dimensional model 302 of box 160 that correspond to key frame 103. As shown in FIG. 3, tone 152 is generally facing away from the viewing perspectives and tone 151 is generally facing toward the viewing perspectives. However, because the right view is slightly offset, a portion of tone 152 is visible. Also, a smaller amount of three dimensional model 302 of box 160 is occluded by three dimensional model 301 of sphere 150.

Figure 4:
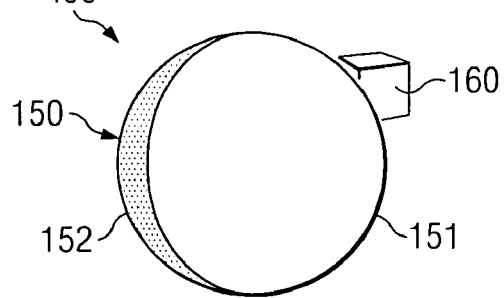
FIGS. 4 and 5 depict stereoscopic images generated according to one representative embodiment.
Figure 5:
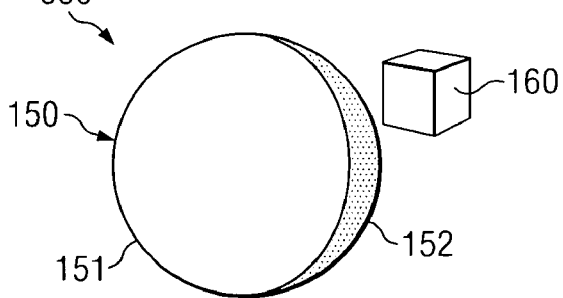

Using three dimensional scene 300, left image 400 and right image 500 may be generated as shown in FIGS. 4 and 5. Specifically, three dimensional scene 300 defines which objects are visible, the position of the objects, and the sizes of the objects for the left and right views. The rendering of the objects in the views may occur by mapping image data onto the three dimensional objects using texture mapping techniques. The encoded transform information may be used to perform the texture mapping in an accurate manner. For example, the rotation transform information encoded for sphere 150 enables the left portion of sphere 150 to include tone 152 in left image 400. The transform information enables the right portion of sphere 150 to include tone 152 in right image 500. Specifically, image data associated with tone 152 in key frames 102 and 104 may be mapped onto the appropriate portions of sphere 150 in images 400 and 500 using the transform information. Likewise, the surface characteristics of the portion of box 160 that has become visible in image 500 may be appropriately rendered using information from key frame 102 and the transform information.

Figure 9:
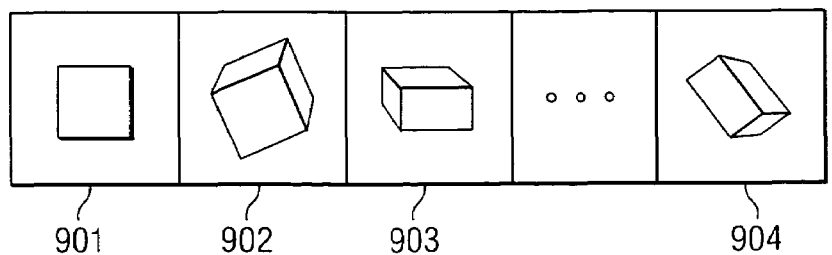
FIG. 9 depicts a set of frames in which objects may be represented using three dimensional models according to one representative embodiment.

To further illustrate the operation of some embodiments, reference is made to FIG. 9. FIG. 9 depict a set of video frames in which a box is rotating in two axes. Using conventional matte modeling techniques, an object matte would be created for each of frames 901-904, because the two dimensional representation of the box is different in each of the frames. The creation of respective object mattes for each of frames 901-904 may then be a time consuming and cumbersome process. However, according to one representative embodiment, an object model is created for frame 901. Because the three dimensional characteristics of the box do not change, only the rotation information may be defined for frames 902-904. The surface characteristics of the box can then be autonomously extracted from frames 902-904 using the object model and the transform information. Thus, some representative embodiments provide a more efficient process for processing video frames than conventional techniques.

FIG. 6 depicts an interrelated set of processes for defining three dimensional objects from video images according to one representative embodiment. In process 601, outlines of objects of interest are defined in selected frames. The outline of the objects may occur in a semi-autonomous manner. The user may manually select a relatively small number of points of the edge of a respective object. An edge tracking algorithm may then be used to identify the outline of the object between the user selected points. In general, edge tracking algorithms operate by determining the least path cost between two points where the path cost is a function of image gradient characteristics. Domain-specific information concerning the selected object may also be employed during edge tracking. A series of Bezier curves or other parametric curves may be used to encode the outlines of the objects. Further user input may be used to refine the curves if desired.

In process 602, camera reconstruction may be performed. Camera reconstruction refers to the process in which the relationship between the camera and the three dimensional scene(s) in the video sequence is analyzed. During this process, the camera's focal length, the camera's relative angular perspective, the camera's position and orientation relative to objects in the scene, and/or other suitable information may be estimated.

In process 603, three dimensional models are created or selected from a library of predefined three dimensional models for the objects. Any number of suitable model formats could be used. For example, Constructive Solid Geometry models could be employed in which each object is represented as a combination of object primitives (e.g., blocks, cylinders, cones, spheres, etc.) and logical operations on the primitives (e.g., union, difference, intersection, etc.). Additionally or alternatively, nonuniform rational B-splines (NURBS) models could be employed in which objects are defined in terms of sets of weighted control points, curve orders, and knot vectors. Additionally, "skeleton" model elements could be defined to facilitate image processing associated with complex motion of an object through a video sequence according to kinematic animation techniques.

In process 664, transformations and translations are defined as experienced by the objects of interest between key frames. Specifically, the translation or displacement of objects, the scaling of objects, the rotation of objects, morphing of objects, and/or the like may be defined. For example, an object may increase in size between key frames. The increase in size may result from the object approaching the camera or from the object actually become larger ("ballooning"). By accurately encoding whether the object has been increased in size as opposed to merely moving in the three dimensional scene, subsequent processing may occur more accurately. This step may be performed using a combination of autonomous algorithms and user input. For example, motion compensation algorithms may be used to estimate the translation of objects. If an object has experienced scaling, the user may identify that scaling has occurred and an autonomous algorithm may calculate a scaling factor by comparing image outlines between the key frames.

In process 605, using the information developed in the prior steps, the positions of objects in the three dimensional scene(s) of the video sequence are defined. The definition of the positions may occur in an autonomous manner. User input may be received to alter the positions of objects for editing or other purposes. Additionally, one or several objects may be removed if desired.

In process 606, surface property data structures, such as texture maps, are created.

FIG. 7 depicts a flowchart for creating texture map data for a three dimensional object for a particular temporal position according to one representative embodiment. The flowchart for creating texture map data begins in step 701 where a video frame is selected. The selected video frame identifies the temporal position for which the texture map generation will occur. In step 702, an object from the selected video frame is selected.

In step 703, surface positions of the three dimensional model that correspond to visible portions of the selected object in the selected frame are identified. The identification of the visible surface positions may be performed, as an example, by employing ray tracing from the original camera position to positions on the three dimensional model using the camera reconstruction data. In step 704, texture map data is created from image data in the selected frame for the identified portions of the three dimensional model.

In step 706, surface positions of the three dimensional model that correspond to portions of the object that were not originally visible in the selected frame are identified. In one embodiment, the entire remaining surface positions are identified in step 706 thereby causing as much texture map data to be created for the selected frame as possible. In certain situations, it may be desirable to limit construction of the texture data. For example, if texture data is generated on demand, it may be desirable to only identify surface positions in this step (i) that correspond to portions of the object not originally visible in the selected frame and (ii) that have become visible due to rendering the object according to a modification in the viewpoint. In this case, the amount of the object surface exposed due to the perspective change can be calculated from the object's camera distance and a maximum inter-ocular constant.

In step 706, the surface positions identified in step 705 are correlated to image data in frames prior to and/or subsequent to the selected frame using the defined model of the object, object transformations and translations, and camera reconstruction data. In step 707, the image data from the other frames is subjected to processing according to the transformations, translations, and camera reconstruction data. For example, if a scaling transformation occurred between frames, the image data in the prior or subject frame may be either enlarged or reduced depending upon the scaling factor. Other suitable processing may occur. In one representative embodiment, weighted average processing may be used depending upon how close in the temporal domain the correlated image data is to the selected frame. For example, lighting characteristics may change between frames. The weighted averaging may cause darker pixels to be lightened to match the lighting levels in the selected frame. In one representative embodiment, light sources are also modeled as objects. When models are created for light sources, lighting effects associated with the modeled objects may be removed from the generated textures. The lighting effects would then be reintroduced during rendering.

In step 708, texture map data is created for the surface positions identified in step 705 from the data processed in step 707. Because the translations, transformations, and other suitable information are used in the image data processing, the texture mapping of image data from other frames onto the three dimensional models occurs in a relatively accurate manner. Specifically, significant discontinuities and other imaging artifacts generally will not be observable.

In one representative embodiment, steps 704-707 are implemented in association with generating texture data structures that represent the surface characteristics of an object of interest. A given set of texture data structures define all of the surface characteristics of an object that may be recovered from a video sequence. Also, because the surface characteristics may vary over time, a texture data structure may be assigned for each relevant frame. Accordingly, the texture data structures may be considered to capture video information related to a particular object.

The combined sets of data (object model, transform information, camera reconstruction information, and texture data structures) enables construction of a three dimensional world from the video sequence. The three dimensional world may be used to support any number of image processing effects. As previously mentioned, stereoscopic images may be created. The stereoscopic images may approximately correspond to the original two dimensional viewpoint. Alternatively, stereoscopic images may be decoupled from the viewpoint(s) of the original video if image data is available from a sufficient number of perspectives. Additionally, object removal may be performed to remove objects from frames of a video sequence. Likewise, object insertion may be performed.

Figure 8:
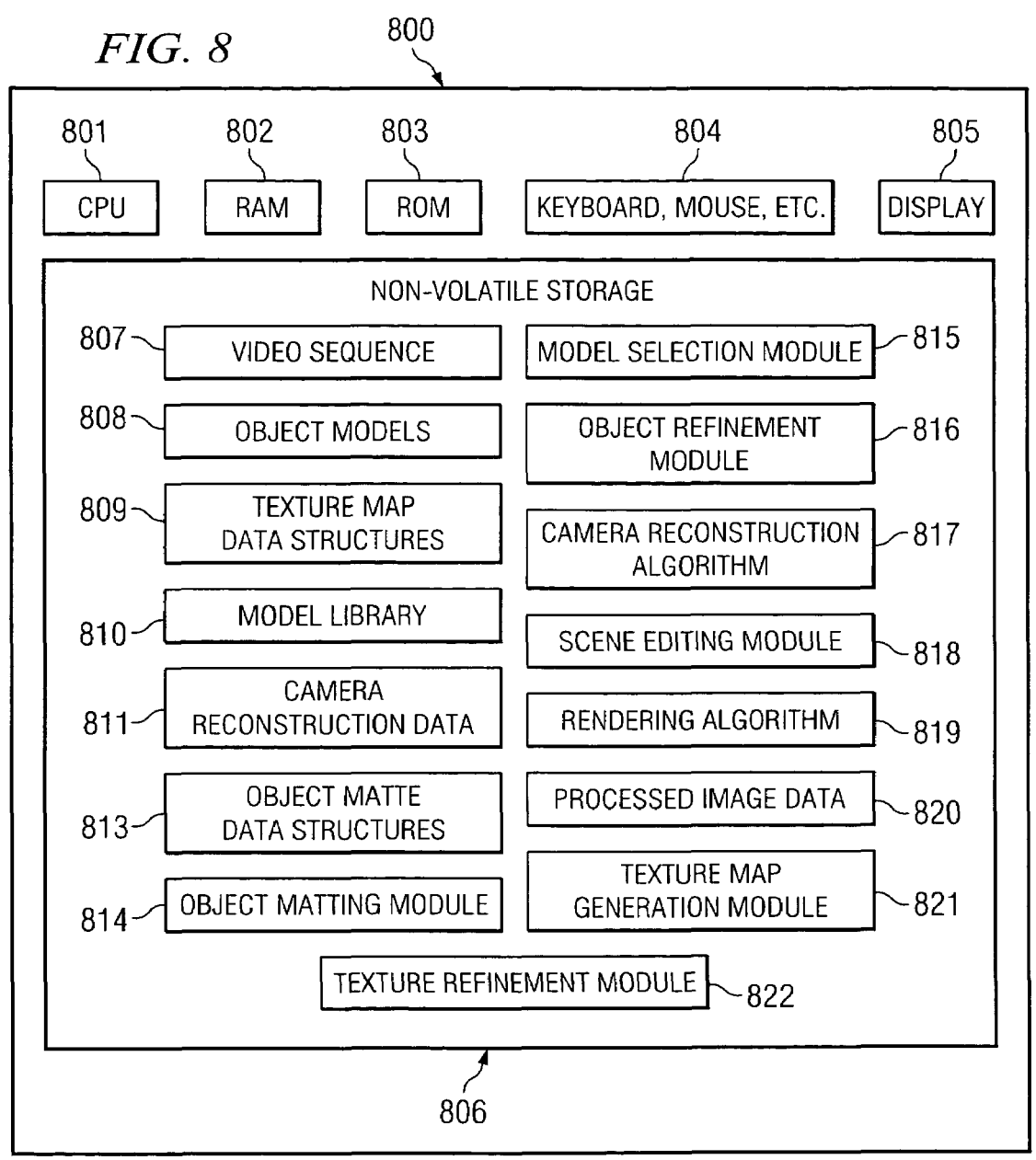
FIG. 8 depicts a system implemented according to one representative embodiment.

FIG. 8 depicts system 800 for processing a sequence of video images according to one representative embodiment. System 800 may be implemented on a suitable computer platform. System 800 includes conventional computing resources such as central processing unit 801, random access memory (RAM) 802, read only memory (ROM) 803, user-peripherals (e.g., keyboard, mouse, etc.) 804, and display 805. System 800 further includes non-volatile storage 806.

Non-volatile storage 806 comprises data structures and software code or instructions that enable conventional processing resources to implement some representative embodiments. The data structures and code may implement the flow-charts of FIGS. 6 and 7 as examples.

As shown in FIG. 8, non-volatile storage 806 comprises video sequence 807. Video sequence 807 may be obtained in digital form from another suitable medium (not shown). Alternatively, video sequence 807 may be obtained after analog-to-digital conversation of an analog video signal from an imaging device (e.g., a video cassette player or video camera). Object matting module 814 defines outlines of selected objects using a suitable image processing algorithm or algorithms and user input. Camera reconstruction algorithm 817 processes video sequence 807 to determine the relationship between objects in video sequence 807 and the camera used to capture the images. Camera reconstruction algorithm 817 stores the data in camera reconstruction data 811.

Model selection module 815 enables model templates from model library 810 to be associated with objects in video sequence 807. The selection of models for objects are stored in object models 808. Object refinement module 816 generates and encodes transformation data within object models 808 in video sequence 807 using user input and autonomous algorithms. Object models 808 may represent an animated geometry encoding shape, transformation, and position data over time. Object models 808 may be hierarchical and may have an associated template type (e.g., a chair).

Texture map generation module 821 generates textures that represent the surface characteristics of objects in video sequence 807. Texture map generation module 821 uses object models 808 and camera data 811 to generate texture map data structures 809. Preferably, each object comprises a texture map for each key frame that depicts as much surface characteristics as possible given the number of perspectives in video sequence 807 of the objects and the occlusions of the objects. In particular, texture map generation module 821 performs searches in prior frames and/or subsequent frames to obtain surface characteristic data that is not present in a current frame. The translation and transform data is used to place the surface characteristics from the other frames in the appropriate portions of texture map data structures 809. Also, the transform data may be used to scale, morph, or otherwise process the data from the other frames so that the processed data matches the characteristics of the texture data obtained from the current frame. Texture refinement module 822 may be used to perform user editing of the generated textures if desired.

Scene editing module 818 enables the user to define how processed image data 820 is to be created. For example, the user may define how the left and right perspectives are to be defined for stereoscopic images if a three dimensional effect is desired. Alternatively, the user may provide suitable input to create a two dimensional video sequence having other image processing effects if desired. Object insertion and removal may occur through the receipt of user input to identify objects to be inserted and/or removed and the frames for these effects. Additionally, the user may change object positions.

When the user finishes inputting data via scene editing module 818, the user may employ rendering algorithm 819 to generate processed image data 820. Processed image data 820 is constructed using object models 808, texture map data structures 809, and other suitable information to provide the desired image processing effects.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for processing a video sequence, comprising:
defining graphical data associated with an object in multiple frames of said video sequence;
associating a three dimensional model with said object;
defining transforms experienced by said object between said multiple frames;
generating texture map data for a first frame of said multiple frames, wherein said generating (i) identifies a first portion of said three dimensional model visible according to a camera position associated with said first frame, (ii) includes defined graphical data associated with said first frame within texture map data for said first portion, (iii) identifies a second portion of said three dimensional model that is not visible according to a camera position associated with said first frame, (iv) processes defined graphical data associated with at least a second frame of said multiple frames according to the defined transforms experienced by said object between said first frame and said at least second frame, and (v) includes said processed graphical data within texture map data for said second portion.

2. The method of claim 1 wherein said defining transforms comprises:
defining changes in position experienced by said object.

3. The method of claim 1 wherein said defined transforms include at least one transform selected from the list consisting of: a scaling transform, a rotational transform, and a morphing transform.

4. The method of claim 1 wherein said defining graphical data comprises:
defining outlines of said object in said multiple frames.

5. The method of claim 4 wherein said defining outlines comprises:
receiving input from a user via a user interface to define a plurality of points on an exterior of said object; and
executing an image processing algorithm to define edges between said plurality of points.

6. The method of claim 1 further comprising:
generating stereoscopic images for said first frame, wherein said generating stereoscopic images comprises rendering said three dimensional model using said generated texture map data from two perspectives.

7. The method of claim 1 further comprising:
repeating said generating texture map data for each of said multiple frames.

8. The method of claim 7 further comprising:
generating a sequence of stereoscopic images using said object model and said texture map data.

9. The method of claim 1 further comprising:
repeating said defining graphical data, associating, defining transforms, and generating for multiple objects in said multiple frames.

10. The method of claim 1 further comprising:
rendering a revised version of said first frame by removing another object that at least partially occludes said object associated with said three dimensional model in said first frame.

11. The method of claim 1 further comprising:
executing a camera reconstruction algorithm, wherein said generating processes defines graphical data associated with said second frame using data generated by said camera reconstruction algorithm.

12. The method of claim 1 wherein said generating prioritizes data for said second portion as a function of temporal distance from said first frame.

13. The method of claim 1 wherein said generating processes said identified graphical data using weighted averaging to compensate for image differences between said first and second frames.

14. A system for processing a video sequence, comprising:
a processor; and
a plurality of object models representing objects in said video sequence using three dimensional elements;
a plurality of transform data structures defining transforms experienced by said objects between said multiple frames;
a texture map generation algorithm stored on a computer readable storage medium executable by the processor for generating texture map data, wherein said algorithm, for each of said object models and for each of said multiple frames, is operable to (i) identify a first portion of a respective object model that is visible according to a camera position of a current frame of said multiple frames; (ii) identify a second portion of said respective object model that is not visible according to said camera position; (iii) include graphical data from said current frame in texture map data for said first portion for said current frame; (iv) process graphical data from at least one frame other than said current frame according to a transform data structure; and (v) include said processed graphical data in texture map data for said second portion.

15. The system of claim 14 wherein said plurality of object models encode data defining positions of said plurality of object models in three dimensions for said multiple frames.

16. The system of claim 14 wherein said plurality of object models encode data defining dimensions of said plurality of object models.

17. The system of claim 14 further comprising:
at least one camera data structure defining a characteristic of a camera used to capture said video sequence.

18. The system of claim 14 further comprising:
a rendering module for rending images using said plurality of object models and said texture map data.

19. The system of claim 17 further comprising:
a scene editing module for modifying object characteristics.

20. The system of claim 19 wherein said scene editing module receives user input to remove an object from a frame to be rendered.

21. The system of claim 19 wherein said scene editing module receives user input to insert an object into a frame to be rendered.

22. The system of claim 14 further comprising:
a rendering module for rendering images using said plurality of object models, said camera data, and said texture map data.

23. The system of claim 14 further comprising a module for reconstructing characteristics of a camera used to capture said video sequence.

24. The system of claim 14 further comprising a module for constructing a geometry representing objects in said video sequence.

* * * * *